United States Patent
Hishiki

(10) Patent No.: US 11,015,070 B2
(45) Date of Patent: *May 25, 2021

(54) SECURITY INK PIGMENT, SECURITY INK, PRINTED MATTER, AND METHOD OF PRODUCING SECURITY INK PIGMENT

(71) Applicant: NGK INSULATORS, LTD., Nagoya (JP)

(72) Inventor: Tatsuya Hishiki, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/552,510

(22) Filed: Aug. 27, 2019

(65) Prior Publication Data

US 2020/0009895 A1    Jan. 9, 2020

Related U.S. Application Data

(63) Continuation of application No. PCT/JP2018/001377, filed on Jan. 18, 2018.

(30) Foreign Application Priority Data

Mar. 6, 2017 (WO) .................. PCT/JP2017/008721

(51) Int. Cl.
*C09D 11/037* (2014.01)
*B41M 3/14* (2006.01)
(Continued)

(52) U.S. Cl.
CPC ........... *C09D 11/037* (2013.01); *B41M 3/144* (2013.01); *B42D 25/382* (2014.10);
(Continued)

(58) Field of Classification Search
None
See application file for complete search history.

(56) References Cited

U.S. PATENT DOCUMENTS

| 6,344,261 | B1 | 2/2002 | Kaule et al. |
| 10,344,210 | B2 * | 7/2019 | Hishiki .................. C09K 11/08 |

(Continued)

FOREIGN PATENT DOCUMENTS

| EP | 0 927 750 A1 | 7/1999 |
| JP | 2006-077191 A | 3/2006 |

(Continued)

OTHER PUBLICATIONS

English translation of WO 2015/119124, Aug. 2015; 23 pages.*

(Continued)

*Primary Examiner* — Helene Klemanski
(74) *Attorney, Agent, or Firm* — Flynn Thiel, P.C.

(57) ABSTRACT

Security of a printed matter is enhanced, and a visual image is made clear if a latent image formed by a coating printed on a matter to be printed for a security enhancement of the printed matter becomes the visual image. A security ink pigment contains a powder. A main constituent of the powder is a perovskite-type oxide. The perovskite-type oxide has a composition expressed as a general formula of $ABO_3$. A is mainly made of Ba. B is mainly made of Sn. The powder emits an infrared fluorescence when being irradiated with an ultraviolet excitation light. The perovskite-type oxide has a crystal lattice constant having a difference equal to or smaller than 0.002 angstrom from a theoretical crystal lattice constant of the perovskite-type oxide having a composition expressed as a composition formula of $BaSnO_3$.

7 Claims, 13 Drawing Sheets

(51) Int. Cl.
  *C09D 11/50* (2014.01)
  *B42D 25/382* (2014.01)
  *B42D 25/387* (2014.01)
  *C01G 19/00* (2006.01)
  *C09K 11/66* (2006.01)

(52) U.S. Cl.
  CPC ......... *B42D 25/387* (2014.10); *C01G 19/006* (2013.01); *C09D 11/50* (2013.01); *C09K 11/663* (2013.01); *C01P 2002/34* (2013.01); *C01P 2002/72* (2013.01); *C01P 2002/76* (2013.01); *C01P 2004/03* (2013.01); *C01P 2004/61* (2013.01); *C01P 2006/12* (2013.01); *C01P 2006/60* (2013.01)

(56) References Cited

U.S. PATENT DOCUMENTS

| | | | |
|---|---|---|---|
| 2006/0063036 A1 | 3/2006 | Iwanaga | |
| 2010/0092375 A1* | 4/2010 | Fukazawa | C04B 35/62675 423/598 |
| 2012/0187341 A1 | 7/2012 | Strek et al. | |
| 2017/0321119 A1 | 11/2017 | Hishiki | |
| 2018/0148643 A1 | 5/2018 | Hishiki | |
| 2019/0382601 A1* | 12/2019 | Hishiki | B41M 3/144 |

FOREIGN PATENT DOCUMENTS

| | | |
|---|---|---|
| WO | 99/38701 A1 | 8/1999 |
| WO | 2015/119124 A1 | 8/2015 |
| WO | 2015/133412 A1 | 9/2015 |
| WO | 2016/121792 A1 | 8/2016 |
| WO | 2017/022344 A1 | 2/2017 |
| WO | WO 2018/163232 A1 * | 9/2018 |
| WO | WO 2018/163234 A1 * | 9/2018 |
| WO | WO 2018/163607 A1 * | 9/2018 |
| WO | WO 2018/163609 A1 * | 9/2018 |

OTHER PUBLICATIONS

English translation of WO 2015/133412, Sep. 2015; 23 pages.*
English language International Search Report for corresponding PCT/JP2018/001377, dated Feb. 20, 2018 (1 page).
English language International Search Report for corresponding PCT/JP2017/008721, dated Apr. 4, 2017 (1 page).
Japanese language International Search Report and Written Opinion for corresponding PCT/JP2018/001355, including English translation thereof, dated Feb. 20, 2018 (13 pages).
Supplementary European Search Report for corresponding European Patent Application No. 18763669.1, dated Apr. 26, 2019 (9 pages).
European Search Report issued in corresponding European Application No. 18764013.1, dated Dec. 4, 2020 (11 pages).

* cited by examiner

CLASSIFICATION 1500 1501 1502 1503

1500 1501 1502 1503

VIEWING UNDER NORMAL CONDITIONS

VIEWING UNDER ULTRAVIOLET LIGHT IRRADIATION

OBSERVING WITH INFRARED CAMERA
UNDER ULTRAVIOLET LIGHT IRRADIATION

SECURITY INK PIGMENT, SECURITY INK, PRINTED MATTER, AND METHOD OF PRODUCING SECURITY INK PIGMENT

CROSS-REFERENCE TO RELATED APPLICATIONS

This is a continuation of PCT/JP2018/001377, filed Jan. 18, 2018, which claims priority to PCT/JP2017/008721, filed Mar. 6, 2017, the entire contents of which are hereby incorporated by reference.

TECHNICAL FIELD

The present invention relates to a security ink pigment, a security ink, a printed matter, and a method of producing the security ink pigment.

BACKGROUND ART

Printed on a material is a coating which forms an image, which is a latent image not visually recognized with the naked eye under normal conditions but becomes a visual image visually recognized with the naked eye under ultraviolet light irradiation, in order to enhance the security of a printed matter for preventing the forgery of the printed matter, for example. Ink used for printing the coating is referred to as a security ink, for example. A technique described in Patent Document 1 is an example thereof.

Techniques described in Patent Documents 2 and 3 relate to the invention described in the detailed description of the invention.

In the technique described in Patent Document 2, phosphor microparticles, which are perovskite-type oxides having a composition expressed as a composition formula of $BaSnO_3$ and converting light in an ultraviolet region into light in an infrared region, are used for enhancing the power generation efficiency of a solar battery.

In the technique described in Patent Document 3, luminous particles, each of which is expressed as a general expression of $Ba_{1-x}SnA_xO_3$, A being Li or Na and x satisfying $0<x<0.4$, and which emit an infrared light when being irradiated with an UV light, are used for a security film. In the technique described in Patent Document 3, an average particle diameter of the luminous particles is preferably 0.3 to 5.0 μm.

PRIOR ART DOCUMENTS

Patent Documents

Patent Document 1: Japanese Patent Application Laid-Open No. 2006-77191
Patent Document 2: International Publication No. 2016/121792
Patent Document 3: International Publication No. 2015/133412

SUMMARY

Problem to be Solved by the Invention

A conventional technique typified by the technique described in Patent Document 1 contributes to a security enhancement of a printed matter. However, a lamp which emits an ultraviolet light is easily available in recent years, so that it is often the case that the security enhancement of the printed matter cannot be sufficiently expected from the conventional technique typified by the technique described in Patent Document 1.

If a latent image formed by a coating printed on the material to be printed for the security enhancement of the printed matter becomes a visual image, it is desired that the visual image is clear.

The present invention is to solve these problems. A problem to be solved by the present invention is to enhance the security of a printed matter, and make a visual image be clear if a latent image formed by a coating printed on a material to be printed for the security enhancement of the printed matter becomes the visual image.

Means to Solve the Problem

A main constituent of a powder contained in a security ink pigment is a perovskite-type oxide which is expressed as a general formula of $ABO_3$, A being mainly made of Ba and B being mainly made of Sn. The powder emits an infrared fluorescence when being irradiated with an ultraviolet excitation light. The perovskite-type oxide has a crystal lattice constant having a difference equal to or smaller than 0.002 angstrom from a theoretical crystal lattice constant of the perovskite-type oxide having a composition expressed as a composition formula of $BaSnO_3$.

Effects of the Invention

According to the present invention, a security of a printed matter is enhanced, and a visual image is clear if a latent image formed by a coating printed on a matter to be printed for the security enhancement of the printed matter becomes the visual image.

These and other objects, features, aspects and advantages of the present invention will become more apparent from the following detailed description of the present invention when taken in conjunction with the accompanying drawings.

DESCRIPTION OF EMBODIMENT(S)

1 First Embodiment

1.1 Printed Matter

Figure 1:
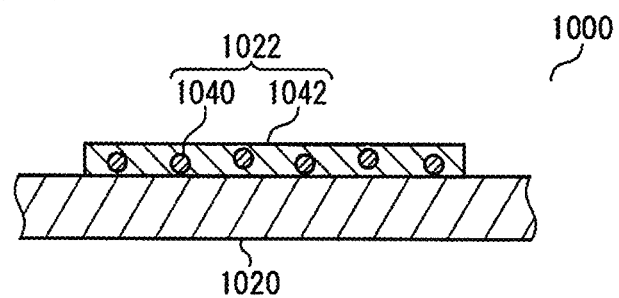
FIG. 1 A cross-sectional view illustrating a printed matter manufactured using a security ink of a first embodiment.

A schematic diagram in FIG. 1 is a cross-sectional view illustrating a printed matter manufactured using a security ink of the first embodiment.

A printed matter 1000 illustrated in FIG. 1 includes a paper sheet 1020 and a coating 1022. The coating 1022 includes a pigment 1040 and a vehicle solid 1042. The pigment 1040 is firmly fixed to the paper sheet 1020 by the vehicle solid 1042. The paper sheet 1020 may be replaced with a material to be printed other than a paper sheet. For example, the paper sheet 1020 may be replaced with a plastic sheet.

The pigment 1040 is a fluorescent body emitting an infrared fluorescence when being irradiated with an ultraviolet excitation light. Accordingly, an image formed by the coating 1022 printed on the paper sheet 1020 is not visually recognized when not being irradiated with the ultraviolet light, and is not visually recognized with the naked eye even when being irradiated with the ultraviolet light. The image becomes a visual image when the image is irradiated with the ultraviolet light and taken with an infrared camera. Accordingly, the image is helpful in enhancing the security of the printed matter 1000 for preventing the forgery of the printed matter 1000, for example.

The pigment 1040 needs to be a fluorescent body having an internal quantum efficiency (IQE) of 10% or more to make the visual image clear. The IQE serves as a barometer indicating the clearness of the visual image.

The pigment 1040 needs to be made up of a powder having a median diameter of 10 μm or less (D50) so that the coating 1022 is printed by a normal printing process and is flat and smooth. D50 serves as a barometer indicating the print performance. However, the coating 1022 is printed by a normal printing process and is flat and smooth in some cases even when the pigment 1040 is made up of a powder having a median diameter D50 larger than 10 μm.

1.2 Security Ink

Figure 2:
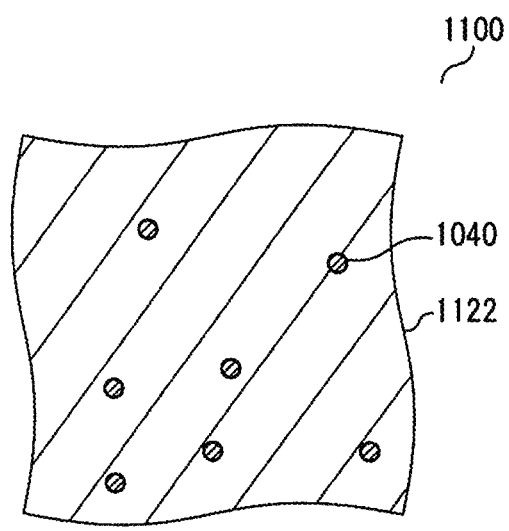
FIG. 2 A cross-sectional view illustrating the security ink of the first embodiment.

A schematic diagram in FIG. 2 is a cross-sectional view illustrating a security ink of the first embodiment.

A security ink 1100 illustrated in FIG. 2 is used for forming the coating 1022 and includes the pigment 1040 and a vehicle 1122. The pigment 1040 is dispersed by the vehicle 1122. The security ink 1100 may contain a constituent other than the pigment 1040 and the vehicle 1122. For example, the security ink 1100 may contain an auxiliary agent.

When the security ink 1100 is used for printing the coating 1022, the security ink 1100 is applied to the paper sheet 1020, a volatile constituent contained in the vehicle 1122 is volatilized, and the pigment 1040 is firmly fixed to the paper sheet 1020 by the solid 1042 contained in the vehicle 1122.

1.3 Pigment

The pigment 1040 is made up of the powder emitting the infrared fluorescence when being irradiated with the ultraviolet excitation light.

A main constituent of the powder is a perovskite-type oxide. The powder may contain a small amount of an accessary constituent.

The perovskite-type oxide has a composition expressed as a general formula of $ABO_3$. A is mainly made of Ba. B is mainly made of Sn. A may contain an element other than Ba. For example, A may contain Zn. B may contain an element other than Sn. The perovskite-type oxide preferably has a composition expressed as a general formula of $Ba_{1-x}SnZn_xO_3$, x satisfying $0 \leq x \leq 0.2$.

Figure 3:
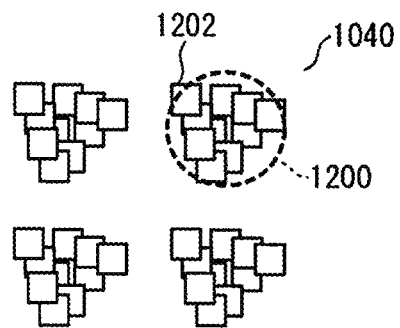
FIG. 3 A schematic diagram illustrating a pigment contained in the security ink of the first embodiment.
Figure 4:
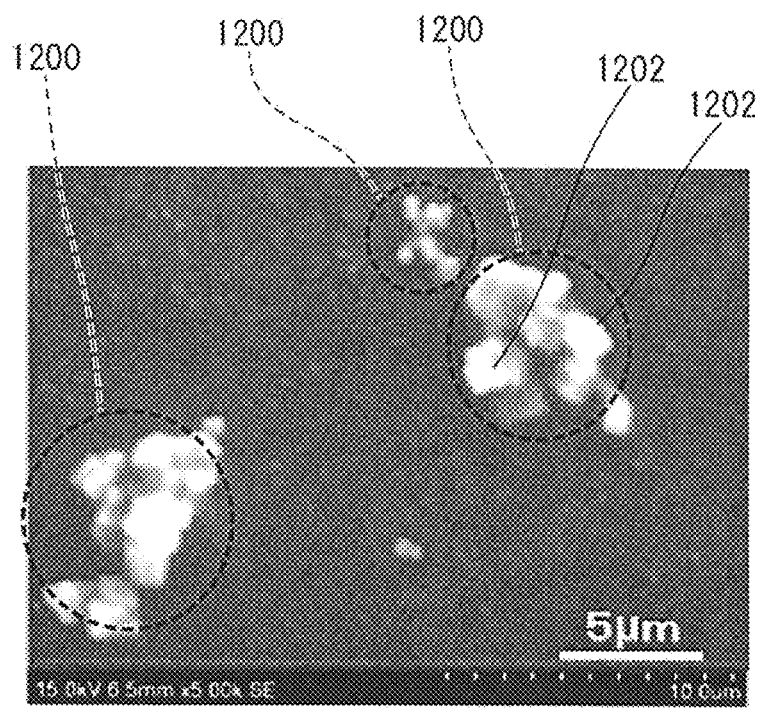
FIG. 4 A scanning electron micrograph of the pigment contained in the security ink of the first embodiment.

FIG. 3 is a schematic diagram illustrating the pigment contained in the security ink of the first embodiment. FIG. 4 is a scanning electron micrograph of the pigment contained in the security ink of the first embodiment.

The pigment 1040 illustrated in FIG. 3 and shown in FIG. 4 contains a large number of aggregated secondary particles 1200. Each of the large number of aggregated secondary particles 1200 includes a large number of aggregated primary particles 1202. The pigment 1040 may include non-aggregated primary particles.

The IQE of the pigment 1040 depends on the primary particle diameter, which is a particle diameter of the primary particles 1202. A specific surface area reflecting the primary particle diameter needs to be equal to or larger than 0.079 $m^2/g$ and equal to or smaller than 10 $m^2/g$ so that the pigment 1040 is the fluorescent body having the IQE of 10% or more. It is considered that the IQE is reduced in a case where the specific surface area is larger than 10 $m^2/g$ and the primary particle diameter is too small by reason that a surface defect such as an unpaired electron dangling bond inhibits the fluorescent emission. It is considered that the IQE is reduced in a case where the specific surface area is larger than 0.079 $m^2/g$ and the primary particle diameter is too large by reason that the excitation light does not reach inside the primary particles 1202, so that the efficiency of the fluorescent emission is reduced.

In addition, the IQE of the pigment 1040 depends on the crystalline nature of the perovskite-type oxide. It is preferable that a difference of the crystal lattice constant of the perovskite-type oxide, which is the main constituent of the powder, from a theoretical crystal lattice constant of the perovskite-type oxide of 4.1163 and having a composition expressed as a composition formula of $BaSnO_3$, is equal to or smaller than 0.002 angstrom so that the pigment 1040 is the fluorescent body having the IQE of 10% or more.

Smoothness of the coating 1022 depends on an aggregated secondary particle diameter which is a particle diameter of the aggregated secondary particles 1200. D50 reflecting the aggregated secondary particle diameter need to be equal to or smaller than 10 μm so that the coating 1022 is printed by a normal printing process and is flat and smooth. A particle size distribution serving as a basis for calculation of D50, which is the particle size distribution diameter, is measured by a laser diffraction scattering method.

1.4 Production of Pigment

Figure 5:
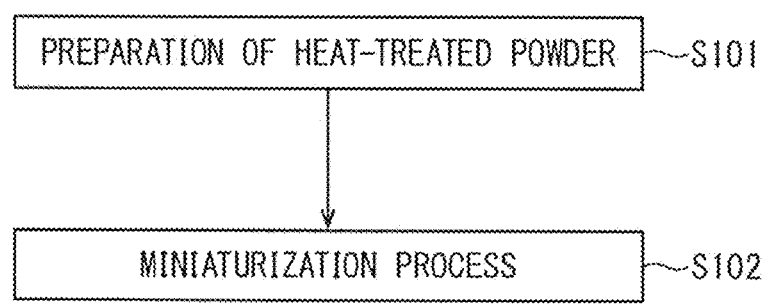
FIG. 5 A flow chart illustrating a procedure of producing the pigment contained in the security ink of the first embodiment.

FIG. 5 is a flow chart illustrating a procedure of producing the pigment contained in the security ink of the first embodiment.

A heat-treated powder is prepared in Step S101 illustrated in FIG. 5. A main constituent of the heat-treated powder is a perovskite-type oxide which is expressed as a general formula of $ABO_3$, the element A being mainly made of Ba and the element B being mainly made of Sn.

For the preparation of the heat-treated powder, powders of starting materials are prepared, the prepared powders of the starting materials are mixed with each other and a mixed powder is prepared, and the prepared mixed powder is heat-treated. The powders of the starting materials contained in the mixed powder react with each other during the heat treatment. Each of the powders of the starting materials is an oxide of a constituent element constituting the perovskite-type oxide other than oxygen. The oxide of the constituent element may be replaced with a precursor which becomes the oxide of the constituent element during the heat treatment. The precursor is a carbonate, nitrate, or oxalate, for example.

Figure 6:
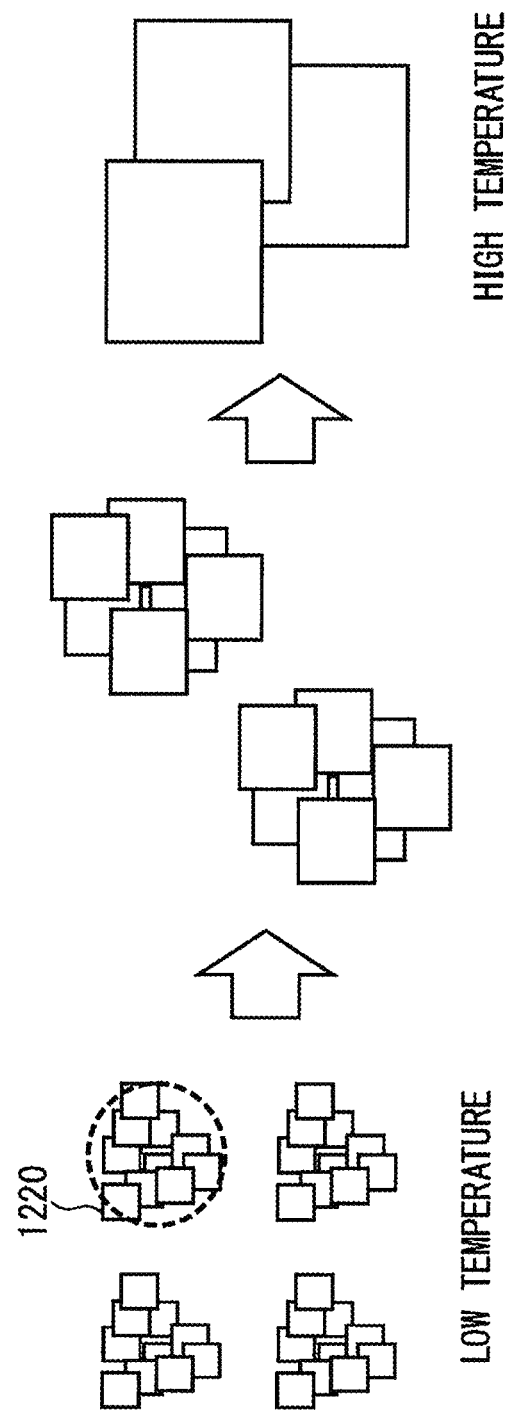
FIG. 6 A schematic diagram illustrating a change in the nature of a heat-treated powder in accordance with a heat treatment temperature in the production of the pigment contained in the security ink of the first embodiment.

FIG. 6 is a schematic diagram illustrating a change in the nature of a heat-treated powder in accordance with a heat treatment temperature in a production of the pigment contained in the security ink of the first embodiment.

As illustrated in FIG. 6, the primary particles 1220 grow, the specific surface area decreases, and the particle size distribution diameter typified by D50 increases as the heat treatment temperature changes from a low temperature to a high temperature. Accordingly, a condition where D50 gets larger than a preferable range may occur just by adjusting the heat treatment temperature even when the specific surface area is within a preferable range.

In Step S102 subsequent to Step S101, when the condition described above occurs, a miniaturization process of reducing the size of D50 without drastically changing the specific surface area is performed on the prepared heat-treated powder. The pigment powder having a specific surface area ranging from 0.079 $m^2/g$ to 10 $m^2/g$ and D50 equal to or smaller than 10 μm is thereby obtained. When the condition described above does not occur, the heat-treated powder obtained without Step S102 may become the pigment powder without change. However, Step S102 may be performed to further enhance the print performance even when the condition described above does not occur.

In the miniaturization process, a classification or a wet dispersion is preferably performed. The wet dispersion may be a dispersion by a wet jet mill or a wet bead mill, or may be an ultrasonic dispersion. In the wet dispersion, the cracking force is made to act on the heat-treated powder which has been dispersed in a dispersion medium, and the aggregated secondary particle constituting the heat-treated powder is cracked to be the smaller aggregated secondary particles or the primary particles.

Figure 7:
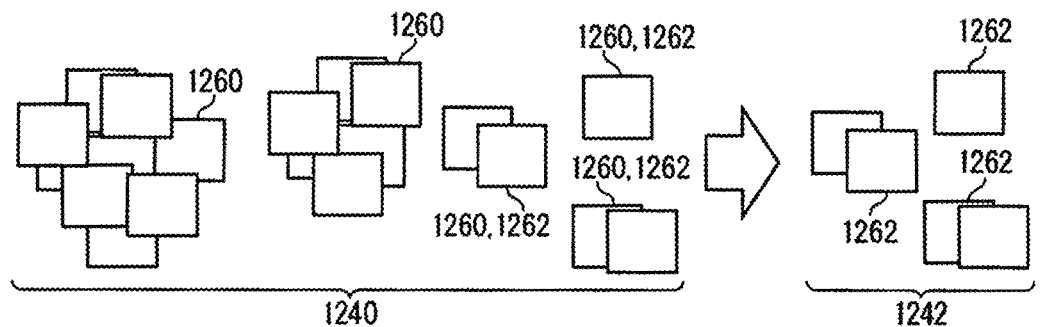
FIG. 7 A schematic diagram illustrating a change in the nature of a powder in accordance with a classification in the production of the pigment contained in the security ink of the first embodiment.

FIG. 7 is a schematic diagram illustrating a change in the nature of the powder in accordance with the classification in the production of the pigment contained in the security ink of the first embodiment.

When the classification is performed in the miniaturization process, small particles 1262 are extracted from particles 1260 constituting the heat-treated powder 1240, and a pigment powder 1242 is obtained, as illustrated in FIG. 7. Accordingly, when the classification is performed in the miniaturization process, the specific surface area does not drastically change, but D50 is reduced. When the classification is performed in the miniaturization process, no damage occurs in the particles 1262, thus the crystalline nature is not deteriorated, the difference of the crystal lattice constant does not increase, and the IQE does not decrease. However, when the classification is performed in the miniaturization process, yield decreases.

Figure 8:
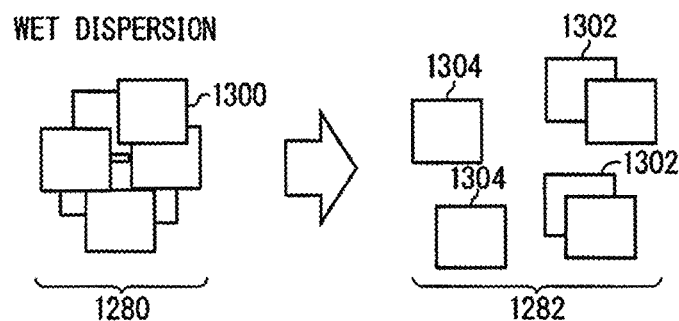
FIG. 8 A schematic diagram illustrating a change in the nature of a powder in accordance with a wet dispersion in the production of the pigment contained in the security ink of the first embodiment.

FIG. 8 is a schematic diagram illustrating a change in the nature of the powder in accordance with the wet dispersion in the production of the pigment contained in the security ink of the first embodiment.

When the wet dispersion is performed in the miniaturization process, an aggregated secondary particle 1300 constituting a heat-treated powder 1280 is cracked to be small aggregated secondary particles 1302 or primary particles 1304, and a pigment powder 1282 is obtained, as illustrated in FIG. 8. Accordingly, when the wet dispersion is performed in the miniaturization process, the specific surface area does not drastically change, but D50 is reduced. When the wet dispersion is performed in the miniaturization process, only a small damage occurs in the particles 1302 and 1304, thus the crystalline nature is not deteriorated, the difference of the crystal lattice constant does not increase, and the IQE does not decrease.

Figure 9:
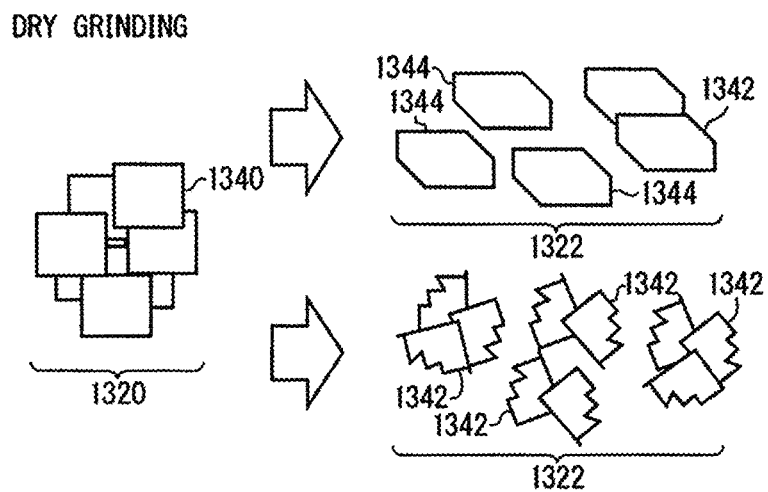
FIG. 9 A schematic diagram illustrating a change in the nature of a powder in accordance with a dry grinding in the production of the pigment contained in the security ink of the first embodiment.

FIG. 9 is a schematic diagram illustrating a change in the nature of the powder in accordance with a dry grinding in the production of the pigment contained in the security ink of the first embodiment.

When the dry grinding is performed by a disk mill or a hammer mill, for example, in the miniaturization process, an aggregated secondary particle 1340 constituting a heat-treated powder 1320 is cracked to be small aggregated secondary particles 1342 or primary particles 1344, and a pigment powder 1322 is obtained, as illustrated in FIG. 9. Accordingly, when the dry grinding is performed in the miniaturization process, the specific surface area does not drastically change, but D50 is reduced. However, when the dry grinding is performed in the miniaturization process, a large damage occurs in the particles 1342 and 1344, thus the crystalline nature is deteriorated, the difference of the crystal lattice constant increases, and the IQE decreases.

1.5 Effect of Zn

Figure 10A:
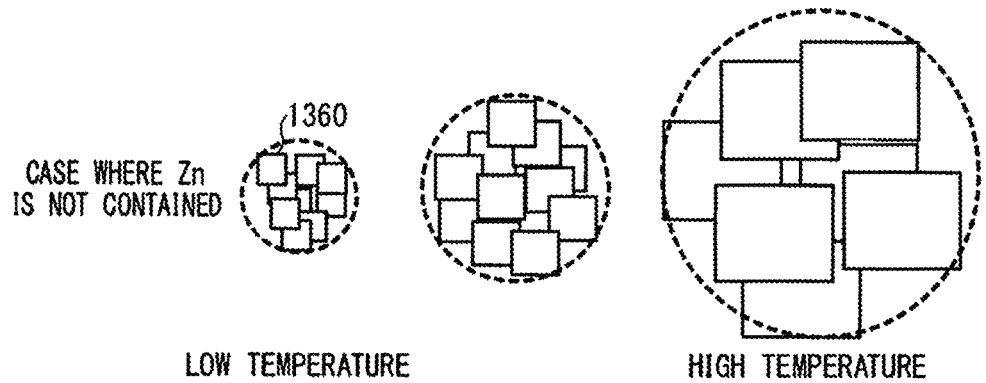
FIG. 10A A schematic diagram illustrating a change in the nature of a powder in accordance with a heat treatment temperature in a case where Zn is not contained in the production of the pigment contained in the security ink of the first embodiment.
Figure 10B:
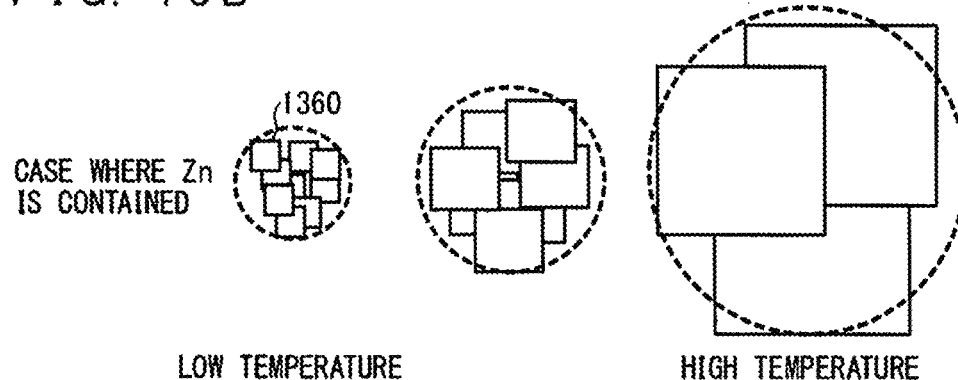
FIG. 10B A schematic diagram illustrating a change in the nature of a powder in accordance with a heat treatment temperature in a case where Zn is contained in the production of the pigment contained in the security ink of the first embodiment.

FIG. 10A is a schematic diagram illustrating a change in a nature of the heat-treated powder in accordance with a heat treatment temperature in a case where Zn is not contained in the production of the pigment contained in the security ink of the first embodiment. FIG. 10B is a schematic diagram illustrating a change in the nature of the heat-treated powder in accordance with a heat treatment temperature in a case where Zn is contained in the production of the pigment contained in the security ink of the first embodiment.

It is predicted that Zn has a role as a sintering aid contributing to an enhancement of the wettability, for example. Accordingly, in the case where Zn is contained as illustrated in FIG. 10B, the growth of the primary particles 1360 is promoted, and the specific surface area decreases, however, the particle size distribution diameter typified by D50 does not drastically change compared to a case where Zn is not contained as illustrated in FIG. 10A. Thus, in the case where Zn is contained, the IQE increases even when D50 takes the same value.

EXAMPLE

1 Outline

A list of "BS/no miniaturization process" in Table 1 indicates a heat treatment temperature and a physical property value of the pigment powder for each of Examples 1 to 6 and Comparative Example 1 in which a perovskite-type oxide has a composition expressed as a composition formula of $BaSnO_3$ and the miniaturization process has not been performed.

A list of "BSZ/no miniaturization process" in Table 1 indicates a heat treatment temperature and a physical property value of the pigment powder for each of Examples 7 to 12 and Comparative Example 2 in which the perovskite-type oxide has the composition expressed as a composition formula of $Ba_{0.995}SnZn_{0.005}O_3$ and the miniaturization process has not been performed.

A list of "BS/classification" in Table 1 indicates a heat treatment temperature and a physical property value of the pigment powder for each of Examples 13 to 15 in which a perovskite-type oxide has a composition expressed as a composition formula of $BaSnO_3$ and a classification has been performed in the miniaturization process.

A list of "BS/wet dispersion" in Table 1 indicates a heat treatment temperature and a physical property value of the pigment powder for each of Examples 16 to 18 in which a perovskite-type oxide has a composition expressed as a composition formula of $BaSnO_3$ and a wet dispersion using a jet mill has been performed in the miniaturization process.

A list of "BS/dry grinding" in Table 1 indicates a heat treatment temperature and a physical property value of the pigment powder for each of Comparative Examples 3 to 5 in which a perovskite-type oxide has a composition expressed as a composition formula of $BaSnO_3$ and a dry grinding using a disk mill has been performed in the miniaturization process.

TABLE 1

| | | Heat treatment temperature (° C.) | Specific surface area (m²/g) | Diameter calculated in terms of specific surface area (μm) | D50 (μm) | IQE (%) | Crystal lattice constant (Å) | Difference of crystal lattice constant (Å) | Ratio |
|---|---|---|---|---|---|---|---|---|---|
| BS/no miniaturization process | Comparative Example 1 | 1000 | 16.00 | 0.05 | 1.50 | 7 | 4.11870 | 0.00240 | 29.0 |
| | Example 1 | 1087 | 8.00 | 0.10 | 2.30 | 18 | 4.11780 | 0.00150 | 22.2 |
| | Example 2 | 1267 | 1.92 | 0.43 | 4.00 | 44 | 4.11730 | 0.00100 | 9.3 |
| | Example 3 | 1340 | 0.91 | 0.91 | 5.29 | 58 | 4.11718 | 0.00088 | 5.8 |
| | Example 4 | 1422 | 0.45 | 1.84 | 6.10 | 57 | 4.11706 | 0.00076 | 3.3 |
| | Example 5 | 1584 | 0.28 | 2.96 | 8.14 | 44 | 4.11698 | 0.00068 | 2.8 |
| | Example 6 | 1750 | 0.16 | 5.18 | 12.00 | 30 | 4.11690 | 0.00060 | 2.3 |
| BSZ/no miniaturization process | Comparative Example 2 | 1000 | 10.50 | 0.08 | 1.60 | 9 | 4.11835 | 0.00205 | 20.3 |
| | Example 7 | 1087 | 3.64 | 0.23 | 2.54 | 26 | 4.11760 | 0.00130 | 11.2 |
| | Example 8 | 1267 | 0.79 | 1.05 | 5.00 | 60 | 4.11705 | 0.00075 | 4.8 |
| | Example 9 | 1340 | 0.42 | 1.97 | 5.89 | 61 | 4.11702 | 0.00072 | 3.0 |
| | Example 10 | 1422 | 0.31 | 2.67 | 6.50 | 58 | 4.11692 | 0.00062 | 2.4 |
| | Example 11 | 1584 | 0.16 | 5.18 | 8.15 | 52 | 4.11675 | 0.00045 | 1.6 |
| | Example 12 | 1750 | 0.10 | 8.29 | 13.00 | 31 | 4.11665 | 0.00035 | 1.6 |
| BS/ classification | Example 13 | 1750 | 0.17 | 4.87 | 9.00 | 28 | 4.11697 | 0.00067 | 1.8 |
| | Example 14 | 1422 | 0.46 | 1.80 | 2.88 | 55 | 4.11680 | 0.00050 | 1.6 |

TABLE 1-continued

| | | Heat treatment temperature (° C.) | Specific surface area (m²/g) | Diameter calculated in terms of specific surface area (μm) | D50 (μm) | IQE (%) | Crystal lattice constant (Å) | Difference of crystal lattice constant (Å) | Ratio |
|---|---|---|---|---|---|---|---|---|---|
| | Example 15 | 1087 | 8.10 | 0.10 | 0.25 | 17 | 4.11760 | 0.00130 | 2.4 |
| BS/wet dispersion | Example 16 | 1750 | 0.18 | 4.60 | 8.00 | 22 | 4.11695 | 0.00065 | 1.7 |
| | Example 17 | 1422 | 0.48 | 1.73 | 1.80 | 48 | 4.11720 | 0.00090 | 1.0 |
| | Example 18 | 1087 | 8.50 | 0.10 | 0.18 | 14 | 4.11810 | 0.00180 | 1.8 |
| BS/dry grinding | Comparative Example 3 | 1750 | 0.20 | 4.14 | 8.50 | 9 | 4.11880 | 0.00250 | 2.1 |
| | Comparative Example 4 | 1422 | 0.50 | 1.66 | 2.30 | 7 | 4.11905 | 0.00275 | 1.4 |
| | Comparative Example 5 | 1087 | 8.60 | 0.10 | 0.30 | 4 | 4.12000 | 0.00370 | 3.1 |

2 Manufacture of Pigment Powder

In the Examples 1 to 6 and Comparative Example 1, powders of barium carbonate ($BaCO_3$) and tin oxide ($SnO_2$), which are starting materials, were weighed so that a molar ratio between barium (Ba) atom and tin (Sn) atom is 1:1, and the weighed powders were mixed and ground to obtain a mixed powder. The powders were mixed and ground by putting the weighed powders into a mortar and further putting an appropriate amount of ethanol into the mortar to obtain a paste-like material, and grinding the paste-like material until the ethanol was volatilized and the dried mixed powder was obtained. The obtained mixed powder was put into a high-purity alumina crucible and sintered at a heat treatment temperature indicated by Table 1 in an air atmosphere to synthesize the heat-treated powder. In Examples 1 to 6 and Comparative Example 1, the miniaturization process was not performed on the heat-treated powder which had been synthesized by a solid phase process, but the heat-treated powder which had been synthesized was adopted to the pigment powder without change.

In Examples 7 to 12 and Comparative Example 2, the heat-treated powder was synthesized in a manner similar to Examples 1 to 6 and Comparative Example 1 except that powders of barium carbonate ($BaCO_3$), tin oxide ($SnO_2$), and zinc nitrate hexahydrate ($Zn(NO_3)_2 \cdot 6H_2O$), which are starting materials, were weighed so that a molar ratio between barium (Ba) atom, tin (Sn) atom, and zinc (Zn) atom is 0.995:1:0.005. Also in Examples 7 to 12 and Comparative Example 2, the miniaturization process was not performed on the heat-treated powder which had been synthesized, but the heat-treated powder which had been synthesized was adopted to the pigment powder without change.

In Example 13, Example 14, and Example 15, the heat-treated powder was synthesized in the manner similar to Example 6, Example 4, and Example 1, respectively. In Examples 13 to 15, the classification was performed on the heat-treated powder, which had been synthesized, to obtain the pigment powder. The classification was performed by an air classifier, turbo classifier TC15NS manufactured by Nissin Engineering Inc.

In Example 16, Example 17, and Example 18, the heat-treated powder was synthesized in the manner similar to Example 6, Example 4, and Example 1, respectively. In Examples 16 to 18, the wet dispersion was performed on the heat-treated powder, which had been synthesized, to obtain the pigment powder. The wet dispersion was performed by a jet mill G-smasher (model code PML1000) manufactured by RIX CORPORATION. In the wet dispersion, ethanol was added to the heat-treated powder, which had been synthesized, to obtain slurry, and the dispersion processing was performed on the obtained slurry, and the slurry on which the dispersion processing had been performed was dried to obtain the pigment powder. An air injection pressure was 0.6 MPa in the dispersion processing. The processing was performed once.

In Comparative Example 3, Comparative Example 4, and Comparative Example 5, the heat-treated powder was synthesized in the manner similar to Example 6, Example 4, and Example 1, respectively. In Comparative Examples 3 to 5, the dry grinding was performed on the heat-treated powder to obtain the pigment powder. The dry grinding was performed by a vibration disk mill RS200 manufactured by Retsch GmbH. A total number of rotations in the dry grinding was 1000 rpm.

3 Evaluation of Pigment Powder

The specific surface area, D50, the IQE, and the crystal lattice constant of the pigment powder of each of Examples 1 to 18 and Comparative Examples 1 to 5 were measured. The diameter calculated in terms of the specific surface area was obtained from the measured specific surface area, the difference of the crystal lattice constant was obtained from the measured crystal lattice constant, and the ratio of D50 to the diameter calculated in terms of the specific surface area was obtained from the obtained diameter calculated in terms of the specific surface area and the measured D50. Table 1 indicates the results thereof. The diameter calculated in terms of the specific surface area $6/\rho s$ is obtained using a density $\rho=7.24$ g/cm³ of $BaSnO_3$ and the specific surface area s, and can be equated with the primary particle diameter. Moreover, the shapes of the particles constituting the pigment powders of Examples 1 to 18 and Comparative Examples 1 to 5 were observed by a scanning electron microscope.

The specific surface area was measured by a specific surface area measurement device Macsorb hm1208 manufactured by Mountech CO., Ltd. Nitrogen was used as an absorbent in the measurement, and an absorption temperature was 77 k.

D50 was measured by a laser diffraction/scattering particle diameter distribution measurement device LA950V2 manufactured by HORIBA, Ltd. In the measurement, the obtained pigment powder and an ultra-low amount of dispersant were added to water, which was a dispersion medium, to disperse the pigment powder in the water. ARON A6114 manufactured by Toagosei Co., Ltd was used as the dispersant. ARON A6114 contains ammonium acrylate copolymer.

The IQE was measured by a fluorospectrophotometer FP8600 manufactured by JASCO Corporation. An integrating sphere unit ISF834 of 60 mmφ and a fluorescent cell of 16 mmφ were used for the measurement, and a wavelength range of the excitation light was set to 350 to 380 nm, and a measurement wavelength range of the fluorescence was set to 750 to 1010 nm.

The crystal lattice constant was measured by an X-ray diffraction device D8 advance manufactured by Brucker Corporation. In the measurement, a crystal phase was identified by a powder X-ray diffraction (XRD) using CuKα ray to obtain an X-ray diffraction pattern, and a Reitveld analysis was performed on the obtained X-ray diffraction pattern using a crystal structure analysis software TOPAS, and the crystal lattice constant was refined to obtain the crystal lattice constant.

The difference of the crystal lattice constant was obtained by subtracting the theoretical crystal lattice constant of $BaSnO_3$ of 4.1163 from the obtained crystal lattice constant.

The shapes of the particles were observed by a scanning electron microscope S-3400N manufactured by Hitachi High-Technologies Corporation. In the observation, an ultrasonic dispersion processing was performed for approximately 10 seconds on the small amount of pigment powder to which ethanol was added to obtain slurry, the obtained slurry was collected by a dropper, and the collected slurry was dropped on an observation stage to obtain a dry substance.

Evaluated were the clearness of the coating containing the pigment powder of Examples 1 to 18 and Comparative Examples 1 to 5 and the print performance of the pigment powder of Examples 1 to 18 and Comparative Examples 1 to 5. Table 2 indicates the results thereof. A clearness A indicates that the coating is extremely clear. A clearness B indicates that the coating is clear. A clearness C indicates that the coating is dark. A print performance A indicates that the coating is flat and smooth to a finger touch. A print performance B indicates that the coating is almost flat and smooth to a finger touch. A print performance C indicates that the coating is rough to a finger touch. It is understood from the IQE indicated by Table 1 and the clearness indicated by Table 2 that the clearness tends to be enhanced with an increase in the IQE, and the clearness becomes A or B in a case where the IQE is equal or higher than 10%. It is understood from D50 indicated by Table 1 and the print performance indicated by Table 2 that the print performance tends to be enhanced with a decrease in D50, the print performance becomes A or B in the case where D50 is equal to or smaller than 10 μm, and the print performance becomes A in the case where D50 is equal to or smaller than 5 μm.

TABLE 2

|  |  | Clearness | Print performance |
|---|---|---|---|
| BS/no miniaturization process | Comparative Example 1 | C | A |
|  | Example 1 | B | A |
|  | Example 2 | A | A |
|  | Example 3 | A | B |
|  | Example 4 | A | B |
|  | Example 5 | A | B |
|  | Example 6 | B | C |
| BSZ/no miniaturization process | Comparative Example 2 | C | A |
|  | Example 7 | B | A |
|  | Example 8 | A | A |
|  | Example 9 | A | B |
|  | Example 10 | A | B |
|  | Example 11 | A | B |
|  | Example 12 | A | C |
| BS/classification | Example 13 | B | B |
|  | Example 14 | A | A |
|  | Example 15 | A | A |
| BS/wet dispersion | Example 16 | B | B |
|  | Example 17 | A | A |
|  | Example 18 | A | A |
| B/S dry grinding | Comparative Example 3 | C | B |
|  | Comparative Example 4 | C | A |
|  | Comparative Example 5 | C | A |

4 Influence of Heat Treatment Temperature

Figure 11:
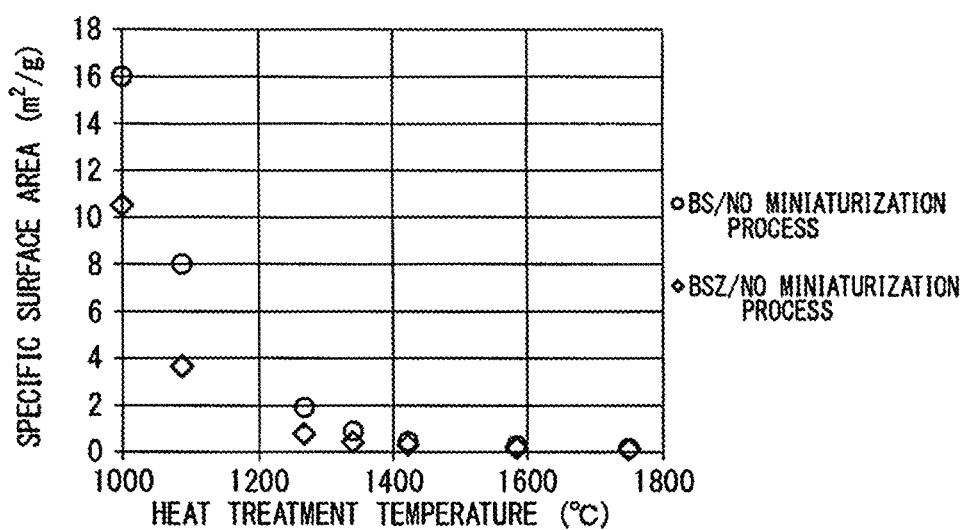
FIG. 11 A correlation diagram showing a correlation between a heat treatment temperature and a specific surface area in the pigment powders of Examples 1 to 12 and Comparative Examples 1 and 2.
Figure 12:
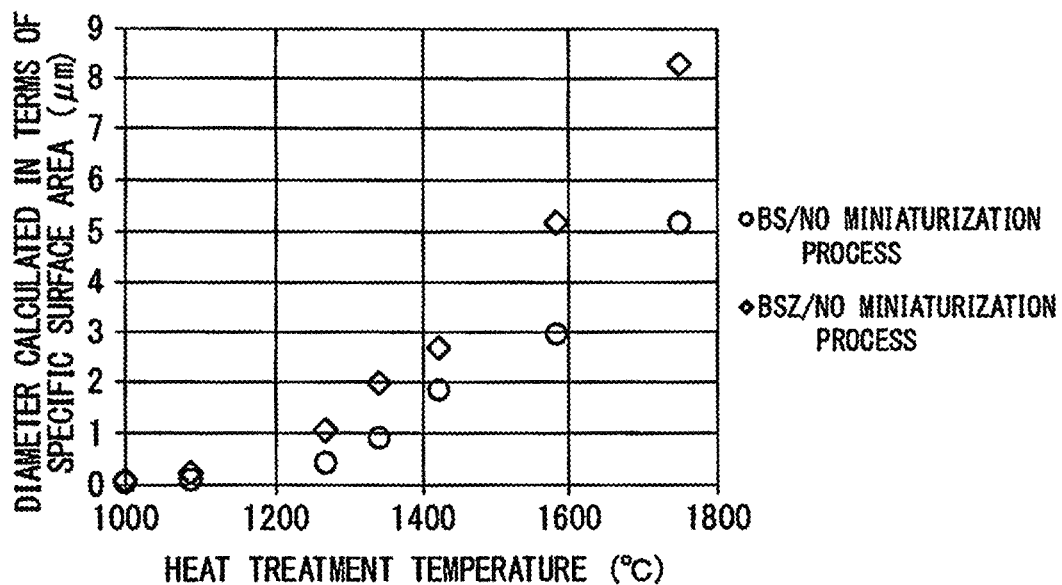
FIG. 12 A correlation diagram showing a correlation between a heat treatment temperature and a diameter calculated in terms of a specific surface area in the pigment powders of Examples 1 to 12 and Comparative Examples 1 and 2.
Figure 13:
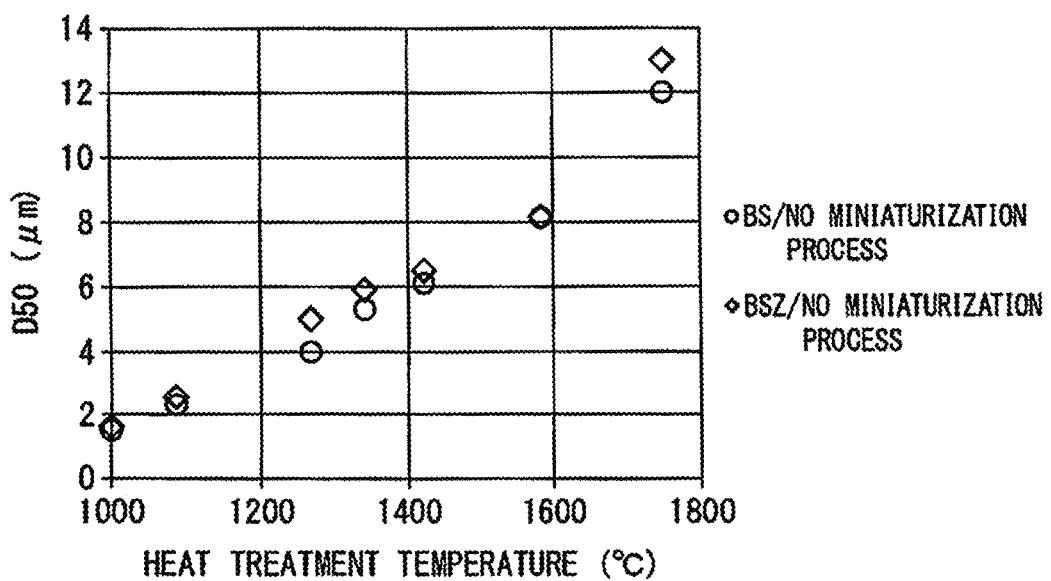
FIG. 13 A correlation diagram showing a correlation between a heat treatment temperature and D50 in the pigment powders of Examples 1 to 12 and Comparative Examples 1 and 2.
Figure 14:
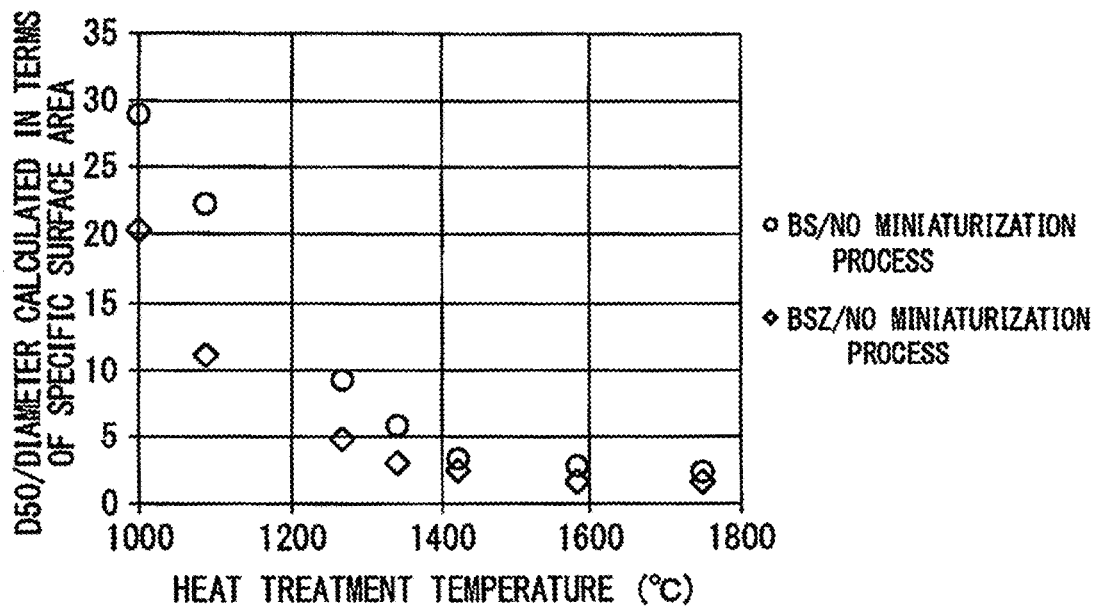
FIG. 14 A correlation diagram showing a correlation between a heat treatment temperature and a ratio of D50 to a diameter calculated in terms of a specific surface area in the pigment powders of Examples 1 to 12 and Comparative Examples 1 and 2.

FIG. 11 is a correlation diagram showing a correlation between a heat treatment temperature and a specific surface area in the pigment powders of Examples 1 to 12 and Comparative Examples 1 and 2. FIG. 12 is a correlation diagram showing a correlation between a heat treatment temperature and a diameter calculated in terms of a specific surface area in the pigment powders of Examples 1 to 12 and Comparative Examples 1 and 2. FIG. 13 is a correlation diagram showing a correlation between a heat treatment temperature and D50 in the pigment powders of Examples 1 to 12 and Comparative Examples 1 and 2. FIG. 14 is a correlation diagram showing a correlation between a heat treatment temperature and a ratio of D50 to a diameter calculated in terms of a specific surface area in Examples 1 to 12 and Comparative Examples 1 and 2.

The primary particles grow as the heat treatment temperature changes from a low temperature to a high temperature. Accordingly, as illustrated in FIG. 11 and FIG. 12, the specific surface area decreases, and the diameter calculated in terms of the specific surface area increases as the heat treatment temperature changes from a low temperature to a high temperature. As illustrated in FIG. 13, D50 increases as the heat treatment temperature changes from a low temperature to a high temperature. As illustrated in FIG. 14, the ratio of D50 to the diameter calculated in terms of the specific surface area decreases as the heat treatment temperature changes from a low temperature to a high temperature. Accordingly, as described above, the condition where D50 gets larger than the preferable range may occur just by adjusting the heat treatment temperature even when the specific surface area is within the preferable range. For example, in Example 6 where the heat treatment temperature is 1750° C., the specific surface area is 0.16 m²/g, which is within a range of 0.079 m²/g to 10 m²/g, however, D50 is 12.00 μm, which exceeds a range equal to or smaller than 10 μm. In Example 12 where the heat treatment temperature is 1750° C., the specific surface area is 0.10 m²/g, which is within the range of 0.079 m²/g to 10 m²/g, however, D50 is 13.00 μm, which exceeds the range equal to or smaller than 10 μm.

5 Influence of Zn

As illustrated in FIG. 13, D50 in the case where Zn is contained is almost the same as D50 in the case where Zn is not contained. However, as illustrated in FIG. 11, the specific surface area in the case where Zn is contained tends to be smaller than the specific surface area in the case where Zn is not contained. As illustrated in FIG. 12, the diameter calculated in terms of the specific surface area in the case where Zn is contained tends to be larger than the diameter calculated in terms of the specific surface area in the case where Zn is not contained. According to these results, it is understood that Zn has a role as a sintering aid and contributes to the decrease in the specific surface area without changing D50.

6 Influence of Miniaturization Process

Figure 15:
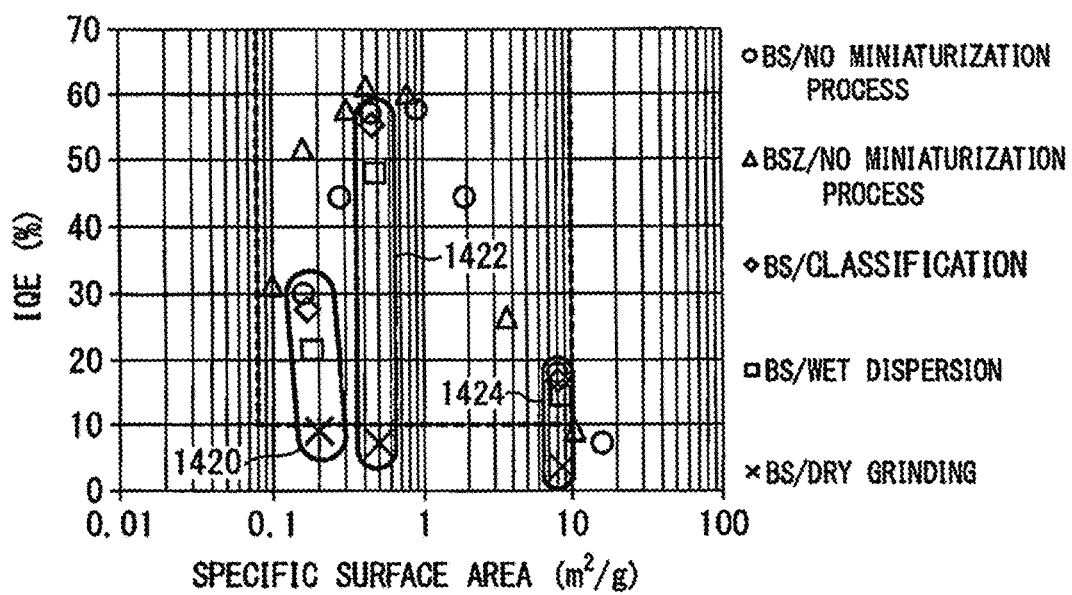
FIG. 15 A correlation diagram showing a correlation between a specific surface area and internal quantum efficiency (IQE) in the pigment powders of Examples 1 to 18 and Comparative Examples 1 to 5.
Figure 16:
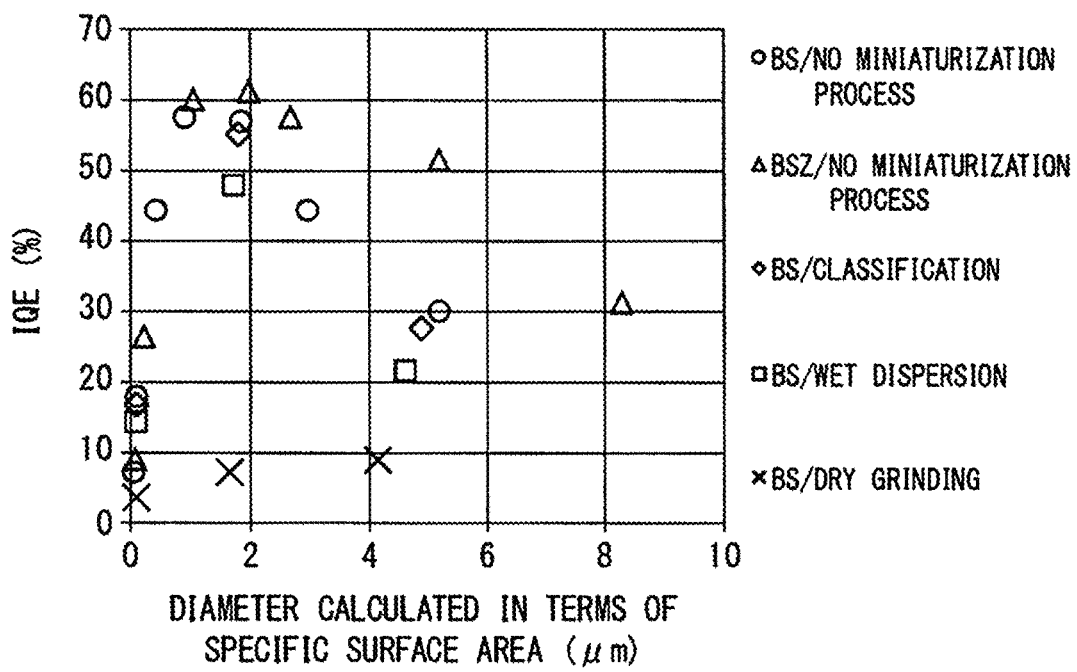
FIG. 16 A correlation diagram showing a correlation between a diameter calculated in terms of a specific surface area and IQE in the pigment powders of Examples 1 to 18 and Comparative Examples 1 to 5.
Figure 17:
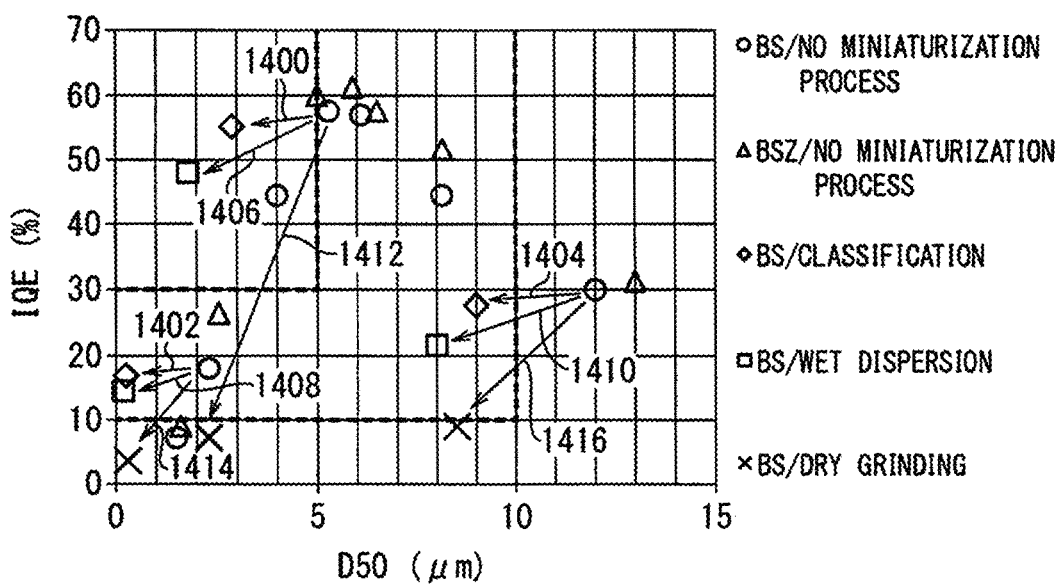
FIG. 17 A correlation diagram showing a correlation between D50 and IQE in the pigment powders of Examples 1 to 18 and Comparative Examples 1 to 5.

FIG. 15 is a correlation diagram showing a correlation between a specific surface area and IQE in the pigment powders of Examples 1 to 18 and Comparative Examples 1 to 5. FIG. 15 also shows a line indicating a lower limit of the preferable range of the specific surface area of 0.079 $m^2/g$, a line indicating an upper limit of the preferable range of the specific surface area of 10 $m^2/g$, and a line indicating a lower limit of the preferable range of the IQE of 10%. FIG. 16 is a correlation diagram showing a correlation between a diameter calculated in terms of a specific surface area and IQE in the pigment powders of Examples 1 to 18 and Comparative Examples 1 to 5. FIG. 17 is a correlation diagram showing a correlation between D50 and IQE in the pigment powders of Examples 1 to 18 and Comparative Examples 1 to 5. FIG. 17 also shows a line indicating an upper limit of the preferable range of D50 of 10 μm, a line indicating a lower limit of the preferable range of the IQE of 10%, a line indicating an upper limit of the more preferable range of D50 of 5 μm, and a line indicating a lower limit of the more preferable range of the IQE of 30%.

As illustrated in FIG. 15, the IQE takes a maximum value in a state where the specific surface area takes an optimum value ranging from 0.079 $m^2/g$ to 10 $m^2/g$ except for the case where the dry grinding is performed, and takes a smaller value as the specific surface area takes a value farther away from the optimum value.

As indicated by arrows 1400, 1402, 1404, 1406, 1408, and 1410 shown in FIG. 17, when the classification or the wet dispersion is performed, D50 decreases, and the IQE is mostly maintained. The IQE is mostly maintained by reason that as indicated by enclosure lines 1420, 1422, and 1424 shown in FIG. 15, when the classification or the wet dispersion is performed, the specific surface area does not drastically change, and no damage occurs in the particles or only a small damage occurs in the particles. According to this result, it can be understood that the classification and the wet dispersion contribute to the enhancement of the print performance while maintaining the clearness of an image.

In contrast, as indicated by arrows 1412, 1414, and 1416 shown in FIG. 17, when the dry grinding is performed, D50 decreases, however, the IQE is not maintained. According to this result, it can be understood that the dry grinding does not contribute to the enhancement of the print performance while maintaining the clearness of the image.

7 Influence of the Difference of the Crystal Lattice Constant

Figure 18:
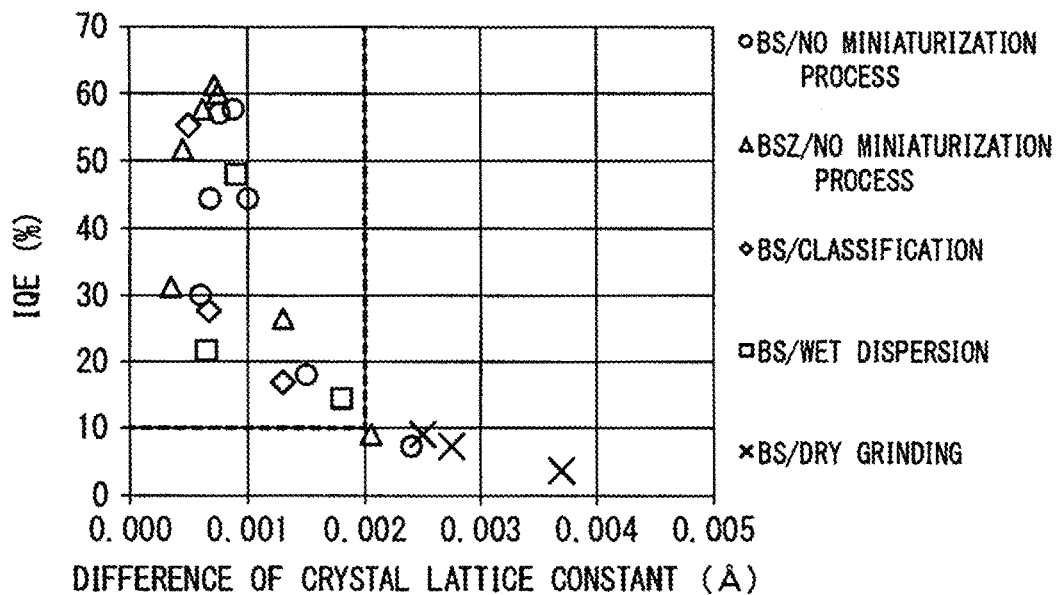
FIG. 18 A correlation diagram showing a correlation between a difference of a crystal lattice constant and IQE in the pigment powders of Examples 1 to 18 and Comparative Examples 1 to 5.
Figure 19:
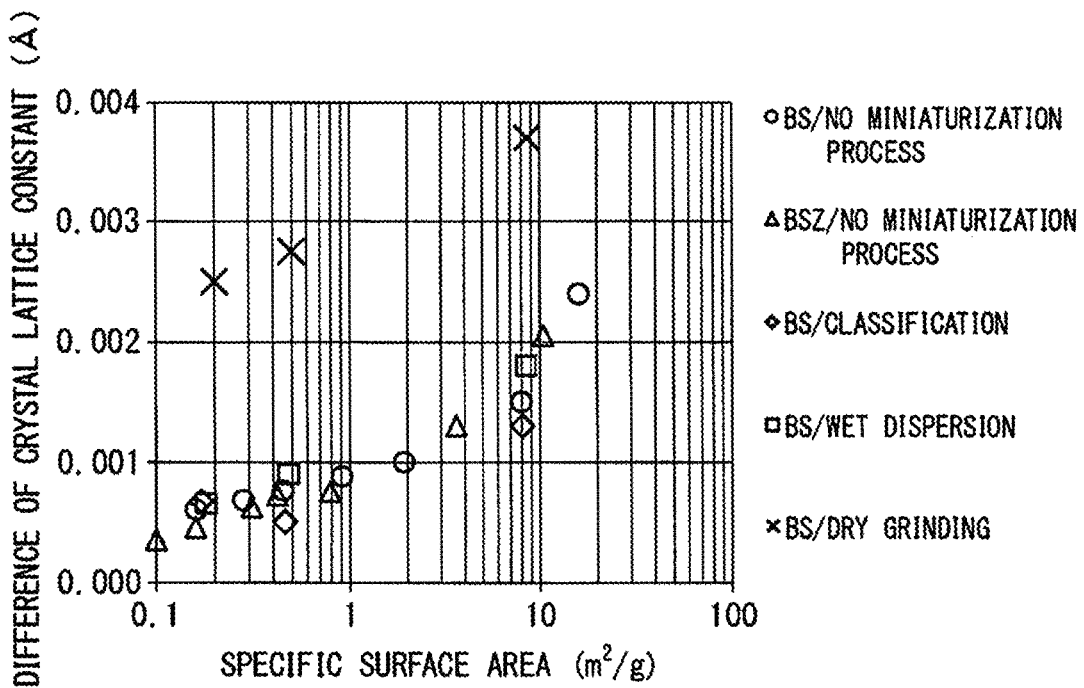
FIG. 19 A correlation diagram showing a correlation between a specific surface area and a difference of a crystal lattice constant in the pigment powders of Examples 1 to 18 and Comparative Examples 1 to 5.

FIG. 18 is a correlation diagram showing a correlation between a difference of a crystal lattice constant and IQE in the pigment powders of Examples 1 to 18 and Comparative Examples 1 to 5. FIG. 18 also shows a line indicating an upper limit of a preferable difference of a crystal lattice constant of 0.002 angstrom and a line indicating a lower limit of a preferable range of IQE of 10%. FIG. 19 is a correlation diagram showing a correlation between a specific surface area and a difference of a crystal lattice constant in the pigment powders of Examples 1 to 18 and Comparative Examples 1 to 5.

As illustrated in FIG. 18, the IQE decreases as the difference of the crystal lattice constant increases. As illustrated in FIG. 18 and FIG. 19, when the classification or the wet dispersion is performed, the crystalline nature is not deteriorated, and the difference of the crystal lattice constant is mostly equal to or smaller than 0.002 angstrom, however, when the dry grinding is performed, the crystalline nature is deteriorated, and the difference of the crystal lattice constant is larger than 0.002 angstrom. Thus, when the dry grinding is performed, the IQE decreases.

8 Measurement Example of Particle Size Distribution

Figure 20:
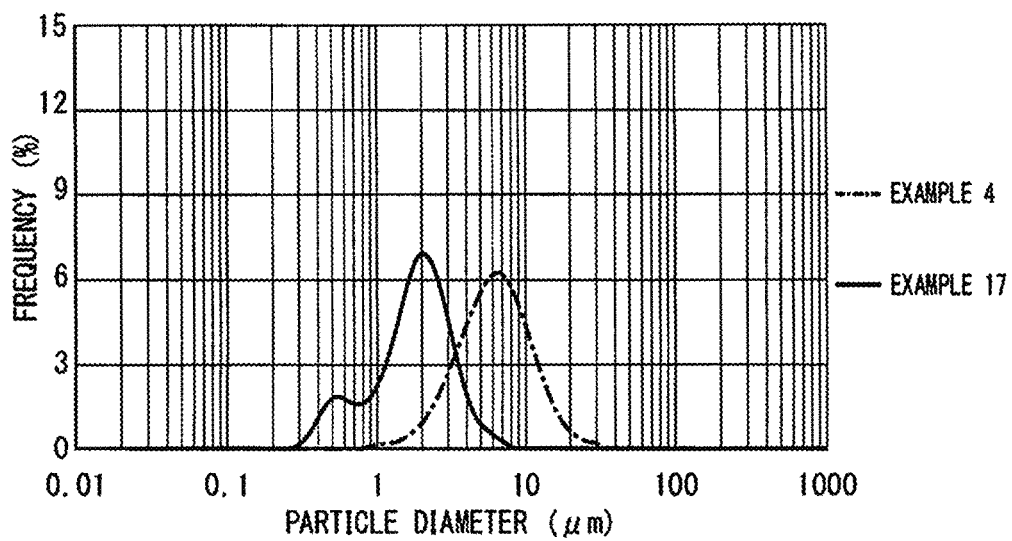
FIG. 20 A diagram showing a particle size distribution of the pigment powders of Examples 4 and 17.

FIG. 20 is a diagram showing a particle size distribution of the pigment powders of Examples 4 and 17.

Example 4 and Example 17 are different from each other in that the wet dispersion is not performed in Example 4, however, the wet dispersion is performed in Example 17. Accordingly, it is understood from the particle size distribution illustrated in FIG. 20 that the particle size distribution is shifted to a direction in which the particle diameter is reduced in size by the wet dispersion.

9 Measurement Example of Spectrum of Excitation Light and Fluorescence

Figure 21:
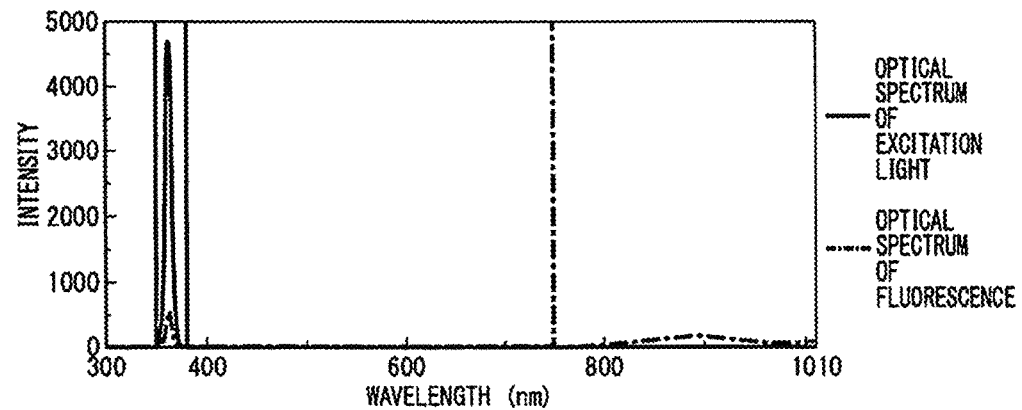
FIG. 21 A diagram showing an optical spectrum of the excitation light and fluorescence in a measurement of IQE of the pigment powder of Example 4.

FIG. 21 is a diagram showing an optical spectrum of the excitation light and fluorescence in the measurement of IQE of the pigment powder of Example 4.

It is understood from the optical spectrum of the excitation light and fluorescence illustrated in FIG. 21 that the pigment powder of Example 4 emits a fluorescence in a wavelength range of 800 to 1000 nm when being irradiated with the excitation light in a wavelength range of 350 to 380 nm.

10 Measurement Example of X-Ray Diffraction Pattern

Figure 22:
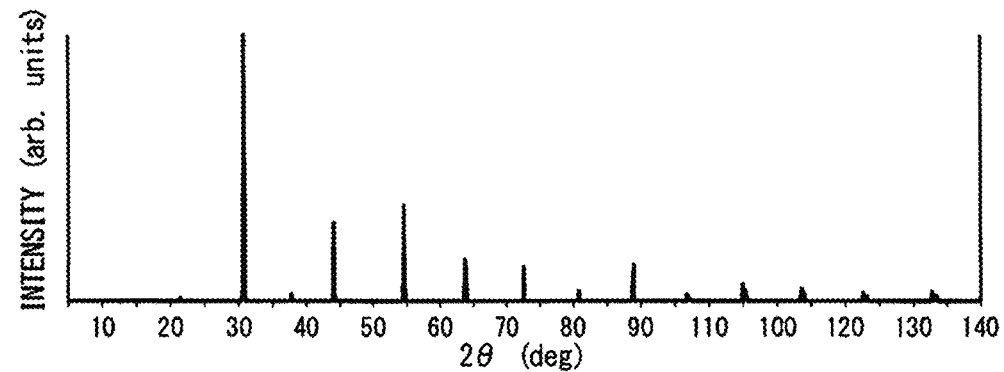
FIG. 22 A diagram showing an X-ray diffraction pattern of the pigment powder of Example 4.

FIG. 22 is a diagram showing a X-ray diffraction pattern of the pigment powder of Example 4.

It is understood from the X-ray diffraction pattern illustrated in FIG. 22 that the pigment powder of Example 4 is mostly made of a single phase of a perovskite-type oxide.

11 Microstructure of Powder

Figure 23:
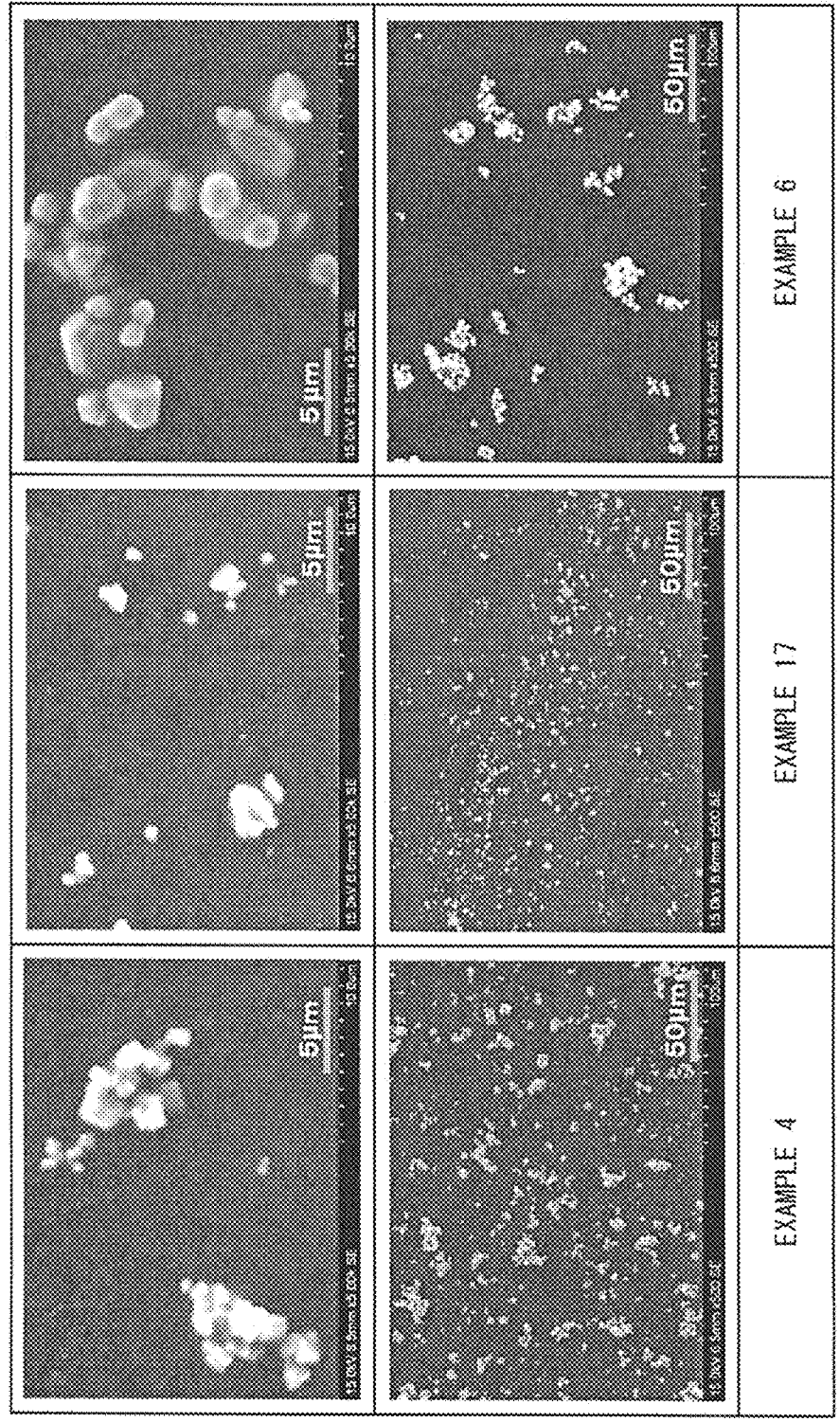
FIG. 23 A drawing showing the shapes of particles constituting the pigment powders of Example 4, Example 17, and Comparative Example 6.

FIG. 23 is a drawing showing the shapes of particles constituting the pigment powders of Example 4, Example 17, and Example 6. FIG. 23 includes electron micrographs obtained by observing the shapes of the particles with a scanning electron micrograph.

It is understood from the shapes of the particles constituting the pigment powder of Example 4 illustrated in FIG. 23 that the aggregated secondary particles including the large number of aggregated primary particles are formed, the diameter calculated in terms of the specific surface area indicated by Table 1, that is 1.75 μm, is mostly the same as the primary particle diameter, and D50 indicated by Table 1, that is 6.10 μm, is mostly the same as the aggregated secondary particle diameter.

It is also understood from the shapes of the particles constituting the pigment powder of Example 6 illustrated in FIG. 23 that the aggregated secondary particles including the large number of aggregated primary particles are formed, the diameter calculated in terms of the specific surface area indicated by Table 1, that is 4.93 μm, is mostly the same as the primary particle diameter, and D50 indicated by Table 1, that is 12.00 μm, is mostly the same as the aggregated secondary particle diameter.

Example 4 and Example 6 are different from each other in that the heat treatment temperature is 1422° C. in Example 4, however, the heat treatment temperature is 1750° C. in Example 6. In contrast thereto, it can be grasped from the shapes of the particles constituting the pigment powder of Example 6 illustrated in FIG. 23 that the aggregated secondary particle diameter exceeds 10 μm. Accordingly, when the heat treatment temperature gets high such as 1750° C., the print performance is reduced as long as the miniaturization process is not performed.

Example 4 and Example 17 are different from each other in that the wet dispersion is not performed in Example 4, however, the wet dispersion is performed in Example 17. In contrast, it is grasped from the shapes of the particles constituting the pigment powder of Examples 4 and 17 illustrated in FIG. 23 that in the pigment powder of Example 17, the aggregation of the primary particles is resolved compared to the pigment powder of Example 4, however, the shapes of the primary particles do not change. This leads to a result that in the pigment powder of Example 17, D50 decreases and the print performance is enhanced compared to the pigment powder of Example 4, however, the IQE does not drastically change, thus the light emission performance can be maintained.

12 Light Emission State

Figure 24:
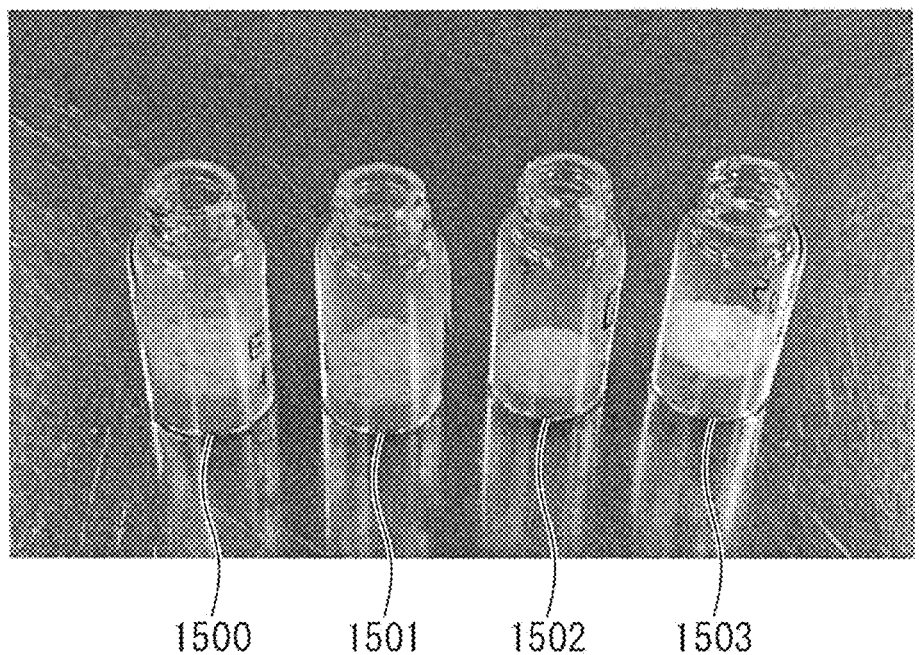
FIG. 24 A drawing showing a photograph obtained by taking images of the pigment powder of Example 4, the pigment powder of Example 7, the pigment powder of Comparative Example 1, and a mixed powder of Example 1, each of which is put in a bottle, with a camera.
Figure 25:
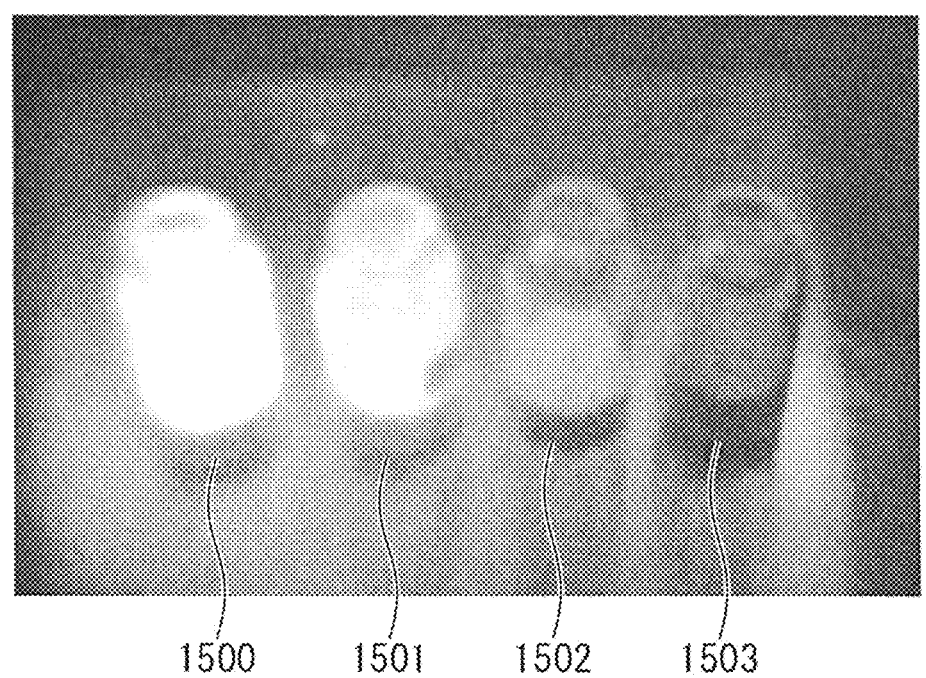
FIG. 25 A drawing showing a photograph obtained by irradiating the pigment powder of Example 4, the pigment powder of Example 7, the pigment powder of Comparative Example 1, and the mixed powder of Example 1, each of which is put in a bottle, with ultraviolet light and taking images of them with an infrared camera.

FIG. 24 is a drawing showing a photograph obtained by taking images of the pigment powder of Example 4, the pigment powder of Example 7, the pigment powder of Comparative Example 1, and a mixed powder of Example 1, each of which is put in a bottle, with a camera. FIG. 25 is a drawing showing a photograph obtained by irradiating the pigment powder of Example 4, the pigment powder of Example 7, the pigment powder of Comparative Example 1, and the mixed powder of Example 1, each of which is put in a bottle, with an ultraviolet light and taking images of them with an infrared camera.

The ultraviolet light with which the powders are irradiated is an ultraviolet light having a wavelength of 365 nm emitted from a handy UV light SLUV-6 manufactured by AS ONE Corporation. A distance from the light to the pigment powders is 5 cm, and the illuminance is 130 LUX. The observation was performed using an infrared light viewer type 1700c manufactured by Japan Medical Services, Inc. in an infrared light camera.

The pigment powder of Example 4, the pigment powder of Example 7, the pigment powder of Comparative Example 1, and a material powder, which has not been sintered yet, of the pigment powder of Example 1 are put in bottles 1500, 1501, 1502, and 1503 illustrated in FIG. 24 and FIG. 25, respectively. It is understood from FIG. 24 and FIG. 25 that a strong fluorescence is emitted from the pigment powders of Examples 4 and 7.

13 Example of Printed Matter

Figure 26:
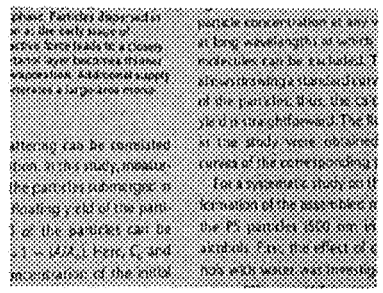
FIG. 26 A drawing showing a case of viewing a printed matter manufactured using the security ink of the first embodiment under normal conditions.
Figure 27:
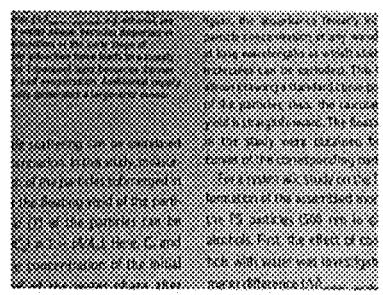
FIG. 27 A drawing showing a case of viewing a printed matter manufactured using the security ink of the first embodiment under ultraviolet light irradiation.
Figure 28:
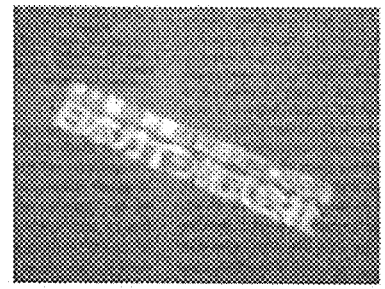
FIG. 28 A drawing showing a case of observing a printed matter manufactured using the security ink of the first embodiment with an infrared camera under ultraviolet light irradiation.

FIG. 26 is a drawing showing a case of viewing a printed matter manufactured using the security ink of the first embodiment under normal conditions. FIG. 27 is a drawing showing a case of viewing a printed matter manufactured using the security ink of the first embodiment under an ultraviolet light irradiation. FIG. 28 is a drawing showing a case of observing a printed matter manufactured using the security ink of the first embodiment with an infrared camera under an ultraviolet light irradiation.

It is understood from FIG. 26 and FIG. 27 that an image formed of the coating 1022 cannot be seen under the normal conditions and also under the ultraviolet light irradiation. It is understood from FIG. 28 that the image formed of the coating 1022 can be recognized only when being observed with the infrared camera under the ultraviolet light irradiation.

The present invention has been shown and described in detail, the foregoing description is in all aspects illustrative and not restrictive. It is therefore understood that numerous modifications and variations can be devised without departing from the scope of the invention.

EXPLANATION OF REFERENCE SIGNS

1000 printed matter
1020 paper sheet
1022 coat
1040 pigment
1042 vehicle solid
1100 security ink
1122 vehicle
1200 aggregated secondary particle
1202 primary particle

The invention claimed is:

1. A security ink pigment, comprising
a powder having a main constituent of a perovskite-type oxide which is expressed as a general formula of $ABO_3$, A being mainly made of Ba and B being mainly made of Sn, and emitting an infrared fluorescence when being irradiated with an ultraviolet excitation light, wherein
the perovskite-type oxide has a crystal lattice constant having a difference equal to or smaller than 0.002 angstrom from a theoretical crystal lattice constant of the perovskite-type oxide having a composition expressed as a composition formula of $BaSnO_3$.

2. The security ink pigment according to claim 1, wherein the powder has a specific surface area ranging from 0.079 $m^2/g$ to 10 $m^2/g$.

3. The security ink pigment according to claim 1, wherein a median diameter of the powder is equal to or smaller than 10 μm.

4. The security ink pigment according to claim 1, wherein the perovskite-type oxide which is expressed as the general formula of $ABO_3$, A being mainly made of Ba and B being mainly made of Sn, has a composition expressed as a general formula of $Ba_{1-x}SnZn_xO_3$, x satisfying $0 \leq x \leq 0.2$.

5. A security ink, comprising:
the security ink pigment according to claim 1; and
a vehicle by which the security ink pigment is dispersed.

6. A printed matter, comprising:
the security ink pigment according to claim 1;
a material to be printed; and
a vehicle solid firmly fixing the security ink pigment to the material to be printed.

7. A method of producing the security ink pigment according to claim 1, comprising:

preparing a powder having a main constituent of a perovskite-type oxide which is expressed as a general formula of $ABO_3$, A being mainly made of Ba and B being mainly made of Sn; and performing a classification or a wet dispersion on the powder.

* * * * *